United States Patent
Nguyen et al.

(10) Patent No.: US 6,834,758 B2
(45) Date of Patent: Dec. 28, 2004

(54) POWER DRIVE UNIT FOR CARGO HANDLING SYSTEMS

(75) Inventors: Frank H Nguyen, Placentia, CA (US); Thomas A Williams, Yorba Linda, CA (US); Edmond Issakhanian, La Crescenta, CA (US); Richard Larson, Claremont, CA (US); William A Gavino, Fountain Valley, CA (US); John E Morse, Garden Grove, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/446,646

(22) Filed: May 28, 2003

(65) Prior Publication Data
US 2004/0074739 A1 Apr. 22, 2004

(30) Foreign Application Priority Data
May 29, 2002 (GB) .............................................. 0212354

(51) Int. Cl.⁷ .............................................. B65G 13/12
(52) U.S. Cl. ..................... 198/782; 198/722; 244/137.1
(58) Field of Search .............................. 198/782, 788, 198/722; 244/137.1

(56) References Cited

U.S. PATENT DOCUMENTS 3,698,539 A  * 10/1972  Schwarzbeck .............. 198/722
3,737,022 A  *  6/1973  DeNeefe et al. ............ 198/782
5,568,858 A  * 10/1996  Thompson ................... 198/782
5,716,028 A  *  2/1998  Evans et al. ............. 244/137.1
5,938,003 A     8/1999  Huber et al.
6,135,269 A  * 10/2000  Huber et al. ................ 198/782
6,420,846 B1 *  7/2002  Wolfe ...................... 244/137.1

* cited by examiner

Primary Examiner—Joseph Valenza
(74) Attorney, Agent, or Firm—Testa, Hurwitz & Thibeault, LLP

(57) ABSTRACT

A power drive unit (PDU) for cargo handling systems comprising a frame arranged to be mounted in use for raising and lowering movement relative to a supporting structure, a drive motor carried by the frame and having an output shaft, a drive roller assembly carried by said frame for engagement in use with a unit load device (ULD) or the like to be moved by the PDU, a first gear train transmitting drive from said motor output shaft to a drive roller of said drive roller assembly, a rotatable lifting cam assembly carried by said frame and driven in use relative to said frame to lift and lower the frame on said mounting, a second gear train for transmitting drive from said motor output shaft to said lifting cam assembly to operate said lifting cam assembly, clutch means operable to connect and disconnect said motor output shaft to and from said second gear train, a torque limiting device limiting the torque transmitted through said clutch, when said clutch is engaged, to said lifting cam assembly, and a brake mechanism between said torque limiting device and said lifting cam assembly for braking said lifting cam assembly against rotation relative to said frame.

12 Claims, 4 Drawing Sheets

POWER DRIVE UNIT FOR CARGO HANDLING SYSTEMS

RELATED APPLICATION

This application claims priority to United Kingdom Patent Application Number 0212354.5, filed May 29, 2002.

TECHNICAL FIELD

The present invention relates to a power drive unit for cargo handling systems, particularly drive units for use in a cargo handling system in the cargo compartment of an aircraft.

BACKGROUND ART

Conventional Power Drive Units (PDUs) include rotationally driven rollers which can be raised through an aperture in a deck panel of the cargo compartment frictionally to engage the under-surface of a cargo unit, conventionally a Unit Load Device (ULD) to move the ULD within the cargo compartment. It would be understood however that such PDUs can be used to handle ULDs and other cargo units in cargo handling systems external to the cargo compartment of an aircraft or other vehicle or vessel.

In the accompanying drawings FIG. 1 is a cross-sectional representation of a conventional PDU. The conventional PDU includes a rigid metallic frame 11 pivotally mounted at 12 to a chassis (not shown in FIG. 1) rigidly secured beneath a deck panel of the floor or deck of a cargo compartment. The axis 13 of pivotal movement of the frame 11 relative to the chassis is parallel to, and spaced below, the plane of the deck panel. Adjacent its end remote from the pivot axis 13, the frame 11 rotatably supports a roller assembly 14 for rotation about an axis 15 parallel to the axis 13. The roller assembly is disposed in alignment with an aperture in the deck panel and in a rest position of the frame 11 relative to the deck panel rubber tyred rollers 15a of the roller assembly 14 lie just beneath the plane of an array of Ball Transfer Units (BTUs) carried on the upper surface of the deck panel to provide a low friction support for a ULD on the deck panel. There is provided an arrangement for raising the PDU by pivoting the frame 11 about the axis 13 to raise the periphery of the rollers 15a through the aperture in the deck panel to engage the under-surface of a ULD seated on the BTUs.

Mounted within the frame 11 is an electric drive motor 16 the rotor shaft 17 of which is equipped, at one end of the shaft 17, with an electro-magnetically operable brake assembly 18. The brake assembly 18 when operative brakes the shaft 17 of the motor against rotation.

The opposite end of the shaft 17 from the brake 18 is equipped with a small diameter pinion gear wheel 19 which meshes with the teeth of a large diameter internal gear wheel 21 mounted to the frame 11 for rotation about an axis parallel to the axes of the shaft 17 and roller assembly 14. A shaft 22 extending from the gear wheel 21 and rotatable therewith is formed with a small diameter pinion gear wheel 23 meshing with a larger diameter gear wheel 24 on a shaft 25 mounted to the frame for rotation about an axis co-extensive with the axis of rotation of the shaft 17. A train of gears 43, 44, 45 all rotatable about parallel axes transmit drive from the gear wheel 24 to a shaft 46 carrying the gear wheel 45. The shaft 46 carries the axially aligned rollers 15a for rotation therewith about the axis 15, the shaft 46 being journalled at its opposite axial ends respectively in bearings on the frame 11 for rotation relative thereto, and the gear wheel 45 being disposed adjacent the mid-point of the length of the shaft 46 between the rollers 15a. It will be recognised therefore that when the brake 18 is de-energised to release the shaft 17 and the motor 16 is energised then the motor 16 drives the rollers 15a for rotation in unison about their common rotational axis 15.

The end of the shaft 25 remote from the motor 16 is coupled to an axially co-extensive drive shaft 26 through the intermediary of a torque limiting device 27 and an electromagnetically operable clutch 28. A small diameter pinion gear wheel 29 on the shaft 26 meshes with a larger diameter gear wheel 31 on a shaft 32 parallel to the shaft 26. A smaller diameter gear wheel 33 on the shaft 32 drives a larger diameter gear wheel 34 driving a co-axial gear wheel 35 meshing with a gear wheel 36 on the end of a cam shaft 37 journalled for rotation in the frame 11. The cam shaft 37 extends the full width of the frame 11 and adjacent its opposite axial ends respectively carries first and second cams 38 which cooperate with fixed cam followers on the chassis of the PDU whereby angular movement of the shaft 37 about its longitudinal axis lifts and lowers the frame 11 about the axis 13 by virtue of the cam action between the cams 38 and the cam followers on the chassis.

The operation of the conventional PDU illustrated in FIG. 1 is as follows. Let us assume firstly that the brake 18 is operative, the clutch 28 and the motor 16 are de-energised, and the cam shaft 37 is in a rotated position such that the frame 11 is collapsed into its rest position below the level of the deck panel. In order to raise the rollers 15a through the aperture in the deck panel to engage a ULD, power is supplied to the motor 16 and at the same time the brake 18 is de-energised so that the shaft 17 is released for rotation. Simultaneously power is applied to the electromagnetic clutch 28 so that the clutch is engaged and rotational movement of the shaft 17 is transmitted through the torque limiter 27 and the engaged clutch 28 to the shaft 26.

Simultaneously rotational movement of the motor shaft 17 is transmitted through the gear train 24, 43, 44, 45 to the rollers 15a to rotate the rollers 15a about their axis 15.

Rotation of the shaft 26 drives the shaft 37 through the step-down gear train 29, 31, 33, 34, 35, 36 interconnecting the shafts 26 and 37. The shaft 37 is thus moved angularly about its longitudinal axis causing the cams 38 to cooperate with the chassis and thus raise the frame 11 relative to the deck panel about the axis 13. The periphery of the rollers 15a is thus caused to project upwardly through the aperture in the deck panel so as frictionally to engage the under-surface of a ULD supported on the deck panel. As the rollers 15a are being rotated by the motor 16 the ULD will be moved relative to the deck panel.

It will be noted that the roller assembly 14 includes a rubber tyred wheel 39 mounted for rotation about the axis 15 and having an outer diameter similar to the outer diameter of the rollers 15a. The wheel 39 engages the under-surface of a ULD at the same time that it is engaged by the rollers 15a. However, the wheel 39 is not driven with the rollers 15a and thus can detect slip between the rollers 15a and ULD since in such a situation the rollers 15a will continue to rotate but the wheel 39 will be stationary, or moving at a different speed, by virtue of its engagement with the ULD. A slip sensor detects any difference in the rotational speeds of the wheel 39 and the rollers 15a and either provides warning of slippage or alternatively de-energises the motor.

When the engagement between the cams 38 and the cam followers reaches its highest point (corresponding to the maximum lift position of the frame 11) the cams 38 engage stops which prevent further rotation of the shaft 37. Thus the gear train and the shaft 26 become stalled since the shaft 37 cannot rotate any further, and the torque limiting device 27 slips so that the motor 16 can continue to operate and to drive the rollers 15a notwithstanding that the shaft 37 is now held against further rotation. It will be recognised that energy is dissipated within the torque limiting device 27 as the device 27 slips throughout the whole of the time that the rollers 15 are rotated in their fully raised position.

In the event that the rollers 15a are subjected to a shock loading in a vertical direction then they can be depressed relative to the deck to accommodate such a shock loading by reverse rotation of the cams 38 and the shaft 37 as permitted by slippage in the torque limiting device 27. Immediately the loading is removed then the rollers will be returned to their fully raised position. This arrangement also accommodates unevenness in the under-surface of a ULD or other cargo unit.

When it is required to reverse the direction of rotation of the rollers 15a in order to drive a ULD in the opposite direction the polarity of the motor 16 is reversed so that the rotor shaft 17 of the motor is rotated in the opposite direction. The effect of this is to reverse the rotational direction of the shaft 37 so that the cams 38 are moved away from their stops lowering the frame 11 to its fully lowered position, and thereafter the cams, which are symmetrical about their rest point, start to raise the frame again by rotation of the cams 38 beyond their rest position. The rollers 15a are of course being rotated in the opposite direction during this movement. Rotation of the shaft 37 ceases when the cams 38 engage their stops with the frame 11 full raised, but with the rollers 15a now rotating in the opposite direction to the previous operation.

If it is desired to brake the motion of a ULD in contact with the rollers 15a the power supply to the motor 16 is broken and the power supply to the brake 18 is re-established to brake the shaft 17 against rotation. Thus as long as the ULD is moving in the direction in which it was driven by the rollers 15a then the cams 38 will remain against their stops, the shaft 37 will not rotate, and the rollers 15a will remain in their raised position but will not be rotated so applying a braking force to a ULD moving relative thereto In order retract the rollers from their operative position to their rest position below the deck panel the clutch 28 is de-energised so that the shaft 26 can rotate freely irrespective of the shaft 17 being held against rotation. Torsion springs 41 acting on the shaft 37 can now rotate the shaft 37 in the reverse direction moving the cams 38 away from their stops and lowering the frame relative to the chassis. Reverse rotation of the shaft 37 is permitted by rotation of the gear train coupling the shaft 37 to the shaft 26, and the freedom of rotation of the shaft 26 by virtue of de-energisation of the clutch 28.

The conventional PDU suffers from a number of recognised disadvantages. Firstly, power dissipated within the torque limiting device 27 during normal operation of the PDU is wasteful of energy, and generates heat which may be a problem in some environments. Secondly, when it is necessary to reverse the drive provided by the rollers to the ULD the PDU must go through a sequence of being lowered to its rest position and then raised again fully to its operative position before the drive from the PDU to the ULD is reversed. This sequence is often referred to as "lift-lower-lift" and the time taken to do this can be several seconds leading to significant operator frustration.

An alternative known form of PDU utilizing a differential gear drive mechanism is disclosed in U.S. Pat. No. 5,938,003. Such PDUs are disadvantageous in that they are very complex to manufacture and assemble and thus are expensive to supply and maintain. Moreover the arrangement disclosed in U.S. Pat. No. 5,938,003 is disadvantageous in that the roller braking mechanism 90 is permanently operative and so consumes power and generates heat and wear in normal use; the lifting mechanism, if obstructed during lifting may not assume the fully raised position after the obstruction is removed; and the roller 30 being cantilevered from a bearing at one end only of its support shaft requires the use of heavy duty bearings to ensure a long working life.

It is an object of the present invention to provide a PDU wherein the aforementioned disadvantages are minimised or obviated.

DISCLOSURE OF INVENTION

In accordance with the present invention there is provided a power drive unit (PDU) comprising a frame arranged to be mounted in use for raising and lowering movement relative to a supporting structure, a drive motor carried by the frame and having an output shaft, a drive roller assembly carried by said frame for engagement in use with a unit load device (ULD) or the like to be moved by the PDU, a first gear train transmitting drive from said motor output shaft to a drive roller of said drive roller assembly, a rotatable lifting cam assembly carried by said frame and driven in use relative to said frame to lift and lower the frame on said mounting, a second gear train for transmitting drive from said motor output shaft to said lifting cam assembly to operate said lifting cam assembly, clutch means operable to connect and disconnect said motor output shaft to and from said second gear train, a torque limiting device limiting the torque transmitted through said clutch, when said clutch is engaged, to said lifting cam assembly, and a brake mechanism between said torque limiting device and said lifting cam assembly for braking said lifting cam assembly against rotation relative to said frame.

Preferably the power drive unit includes a control system which is arranged to receive control input from an operator and to effect control over operation of said motor, said clutch, and said brake mechanism.

Desirably said control system includes a timer which is arranged so that after the lapse of a pre-determined time period from the point at which the motor is operated to raise the frame, the control system initiates operation of said brake to lock said lifting cam assembly, and disengages said clutch to disconnect said second gear train from said motor output shaft.

Alternatively said control system includes a sensor detecting the fully raised position of the frame and in response thereto signalling the control system to initiate operation of said brake to lock said lifting cam assembly, and disengage said clutch to disconnect said second gear train from said motor output shaft.

Conveniently the control system includes both a timer which is arranged to produce a signal after the lapse of a pre-determined time period from the point at which the motor is operated to raise the frame, and a sensor detecting the fully raised position of the frame and producing a signal responsive thereto, the control system responding to the earliest of, or both, signals to initiate operation of said brake to lock said lifting cam assembly, and disengage said clutch to disconnect said second gear train from said motor output shaft.

Preferably the control system is so arranged that said clutch is disengaged fractionally after engagement of said brake.

Preferably a resiliently compliant mounting system is interposed between said frame and the fixed support structure supporting the power drive unit. Conveniently said power drive unit includes a chassis to which said frame is pivotally mounted, and a resiliently compliant coupling mechanism securing said chassis to the fixed support structure.

Preferably the roller assembly includes first and second axially aligned rollers carried by bearing supports at both axial ends of the assembly.

Preferably there is provided a further brake for braking the motor output shaft, said further brake also being under the control of said control mechanism.

BRIEF DESCRIPTION OF THE INVENTION

DETAILED DESCRIPTION OF PREFERRED EMBODIMENTS

Figure 1:
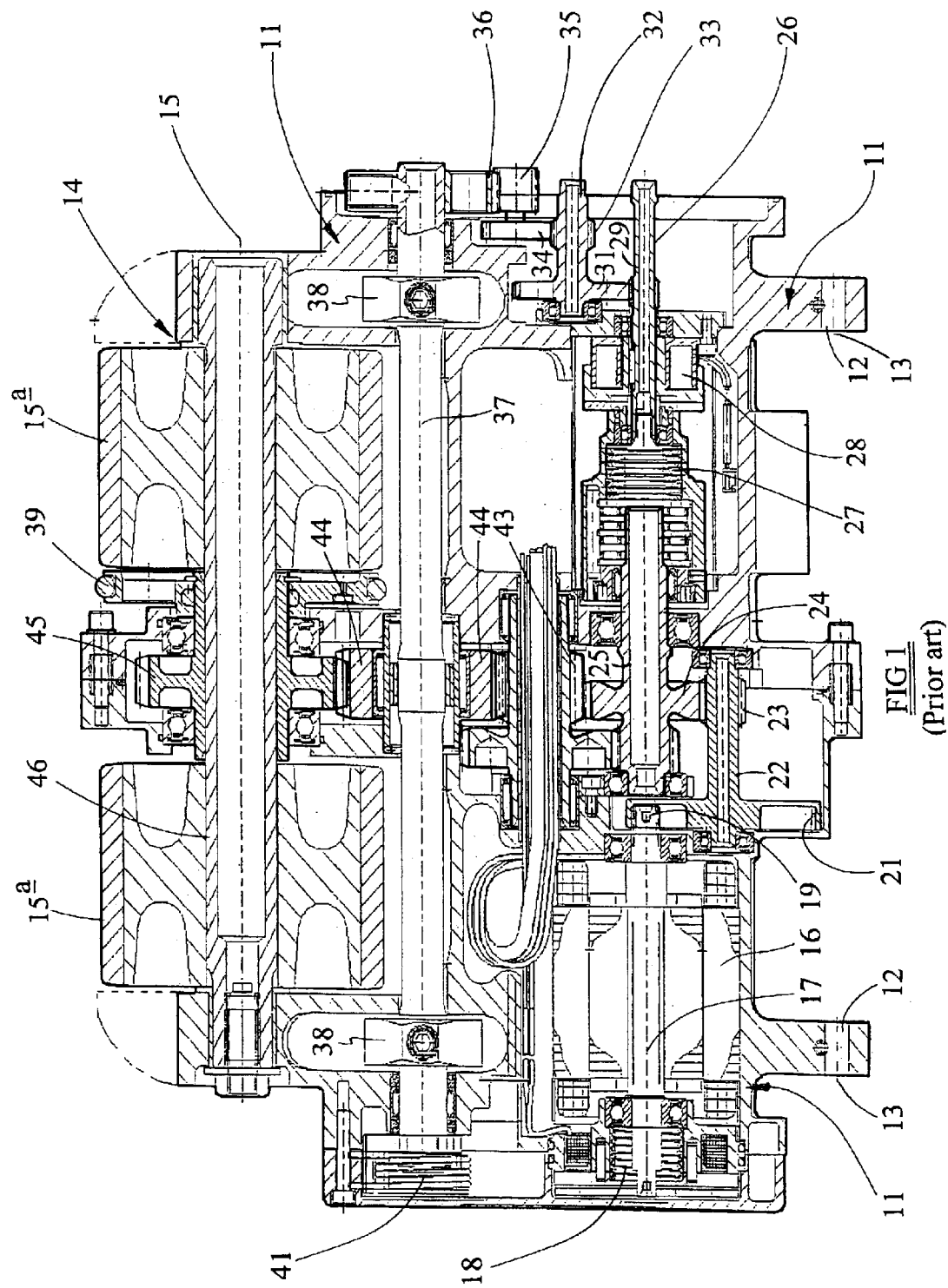
FIG. 1 is a cross-sectional representation of a known power drive unit for an aircraft cargo handling system.
Figure 2:
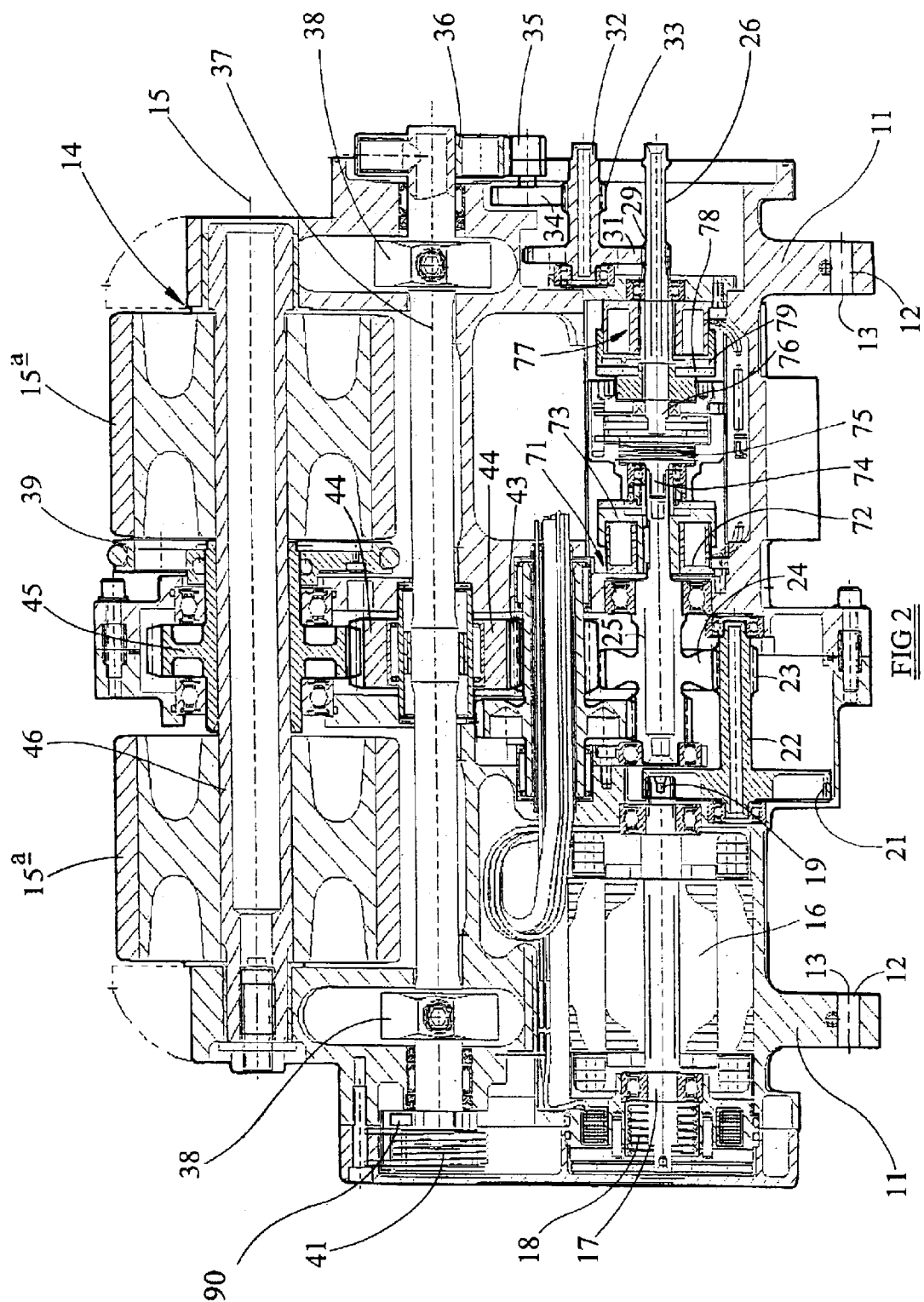
FIG. 2 is a view similar to FIG. 1 of a power drive unit in accordance with a first example of the present invention.

It will be noted that the structure of the power drive unit of FIG. 2 is similar to that of FIG. 1, and like components bear the same reference numerals in both drawings. It can be seen therefore that the arrangement of the motor 16 together with its output shaft 17 and brake 18 is unchanged as is the roller assembly 14 and the gear train 24, 43, 44, 45 transmitting drive from the shaft 25 and pinion wheel 24 to the rollers 15a. Furthermore, the second gear train which transmits rotation of the shaft 26 through the gears 29, 31, 33, 34, 35, and 36 to the cam shaft 37 to move the cams 38 angularly is also unchanged. However significant changes have been made in the arrangement whereby drive from the shaft 25 (driven by the shaft 17 of the motor 16) is transmitted to the shaft 26.

It can be seen in FIG. 2 that the shaft 25 carries, at its end remote from the motor 16 the input member 72 of an electro-magnetic clutch 71. An output member 73 of the clutch 71 is positioned co-axial with the input member 72 and is coupled to a shaft arrangement 74 separate from, but having its axis co-extensive with, the shaft 25. The shaft 74 is secured to the input of a torque limiting arrangement 75 of known form which may be similar in its structure and operation to the torque limiting device 27 of the arrangement described with reference to FIG. 1. A detailed understanding of the operation of the torque limiting device is not necessary to an understanding of the invention, and it is sufficient to recognise that rotation of the shaft 74 will be transmitted through the torque limiting device 75 to a further shaft 76 separate from, but having its axis co-extensive with the shaft 74, provided that the torque to be transmitted does not exceed a pre-determined value. If the shaft 76 is held against rotation while the shaft 74 rotates then a point will be reached at which the torque applied to the device 75 exceeds the set value of the device 75 whereupon the device will slip so that the shaft 74 rotates relative to the shaft 76.

The shaft 76 at the output of the torque limiting device 75 is an integral extension of the shaft 26 and has rotatable therewith a brake element 78 of an electro-magnetically operable brake 77. A fixed brake element 79 secured to the frame 11 co-acts with the rotatable brake element 78 so that when the electro-magnetically operable brake is energised the elements 78 and 79 are held against relative rotation and thus the shaft 26 is held against rotation relative to the frame 11.

Figure 4:
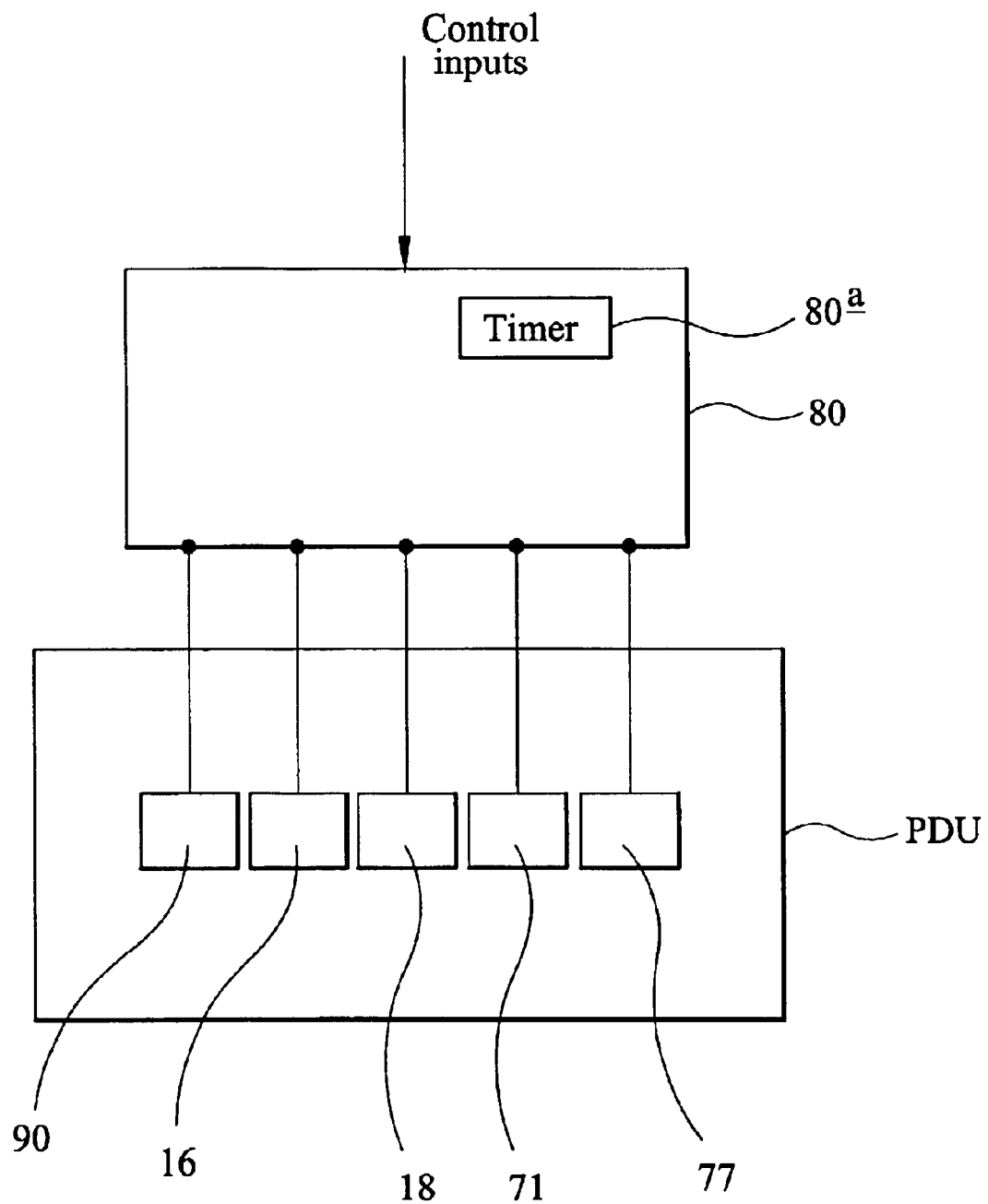

As illustrated diagrammatically in FIG. 4 of the drawings the PDU includes an electronic control system 80 effecting control over energisation of the motor 16, operation of the brake 18, operation of the clutch 71, and operation of the brake 77. With the PDU of FIG. 2 in its rest position, that is to say with the frame collapsed so that the periphery of rollers 15a is below the load carrying plane of the cargo deck, a control input in the form of a "raise" command given by an operator by means of switches or the like is accepted by the control system 80 which then energises the electric motor 16 and de-energises the brake 18 so that the brake 18 is released. Simultaneously the clutch 71 is energised and the brake 77 is de-energised so that rotation of the output shaft 17 of the motor is transmitted from the shaft 25 through the clutch 71, the torque limiting device 75, and the shaft 26 to the second gear train connecting the shaft 26 to the shaft 37 of the cam arrangement. At the same time drive is transmitted from the drive pinion 24 of the shaft 25 through the first gear train to the rollers 15a to rotate the rollers.

Rotation of the shaft 37 in the frame is accompanied by movement of the cams 38 relative to their respective cam followers and thus the frame 11 is pivoted about the axis 13 to raise the rollers 15a through the aperture in the deck panel of the cargo compartment. The speed of operation of the motor 16 is pre-determined, and thus the time taken for the frame 11 to be raised from its rest position to its fully operative position is known. The control system 80 includes a timing arrangement 80a which, at the lapse of a pre-determined period of time from energisation of the motor 16, signals the control system 80 to energise the brake 77 and de-energise the clutch 71.

The period of time set by the timer 80a is in excess of the amount of time calculated for the motor 16 and cams 38 to raise the frame 11 from its rest position to its fully raised position. Thus as the frame reaches its fully raised position the cams 38 will engage the stops associated with the cam followers and further rotation of the shaft 37 will be prevented. The shaft 26 will thus cease to rotate and as the shaft 25 is continuing to rotate the torque limiting device 75 will slip permitting rotation of the motor 16 to continue, driving the rollers 15a, even though the shaft 37 can rotate no further. The control system 80 energises the brake 77 to lock the shaft 26 against rotation in either direction, fractionally before de-energising the clutch 71; this of course does not have any impact on the operation of the PDU since the shaft 26 was already stationary, and the device 75 was slipping. However disengagement of the clutch 71 disconnects the shaft 25, and therefore the motor 16, from the shaft 26 and shaft 37. The brake 77 in preventing rotation of the shaft 26 in either direction, locks the frame in its fully raised position by locking the cams 38 against movement. However, transmission of drive to the rollers 15a is not affected and no power is now being dissipated in the torque limiting device 75 since disengagement of the clutch 71 has disconnected the torque limiting device from the shaft 26 and thus no drive is applied to the torque limiting device.

It will be understood that in the PDU illustrated in FIG. 2, should it become necessary to reverse the direction of rotation of the rollers 15a then the polarity of the motor 16 can be reversed, if necessary using the brake 18 momentarily to arrest rotation of the shaft 17 of the motor, the first gear train, and the rollers 15a, to reverse the drive to the rollers 15a. As the clutch 71 is disengaged the reversal of rotation of the motor 16 has no effect whatsoever on the shaft 37 and the cams 38 and thus the frame 11 remains in its raised position throughout the change in drive rotation to the rollers 15a.

Clearly, by comparison with the arrangement shown in FIG. 1 there are two immediate and very significant advantages. Firstly, during normal operation power is dissipated in the torque limiting device 75 for a brief period only. Thereafter the clutch 71 is de-energised and no further power dissipation in the device 75 is required while the frame is maintained in its raised position. Secondly, when drive reversal to the rollers 15a is required, such drive reversal can be achieve extremely quickly, and does not require the "lift lower lift" sequence necessitated by the mechanical arrangement of FIG. 1 as the disengagement of the clutch 71 has disconnected the raising mechanism from the motor drive to the rollers.

Where it is necessary to apply a braking action to a ULD or the like the motor 16 can be de-energised and the brake 18 can be applied so that rotation of the rollers 15a is braked. Again this has no bearing on the operation of the lifting and lowering cam mechanism of the frame 11 since the clutch 71 is disengaged.

When the operator wishes to lower the rollers 15a to their rest position a "lower" signal given to the control system 80 causes the control system 80 to de-energise the brake 77 so that the brake element 78 is free to rotate relative to the brake element 79 and thus the cam shaft 37 and the cams 38 can be rotated back to their rest position, to allow lowering of the frame 11 about the axis 13, under the action of the return springs 41 acting on the shaft 37. As the cams 38 rotate back towards their rest position the frame 11 pivots back to its rest position under gravity.

A possible area of difficulty noted with the mechanism of FIG. 2 is that when the clutch 71 is disengaged and the brake 77 is engaged then the position of the frame 11 is locked. Thus in the event that raising movement of the frame 11 is impeded, for example by the rollers 15a engaging a downwardly protruding of part of a ULD or the like, then raising movement of the frame will be obstructed at a point before the fully raised position is achieved. Before the obstruction is cleared the torque limiting device 75 will be slipping, and the timer of the control system 80 may well have signalled the application of the brake 77 and the disengagement of the clutch 71. Thereafter, should the obstruction to full raising of the frame 11 be removed the frame will not achieve its fully erected position since the clutch 71 will be disengaged and the brake 77 will be preventing any further movement of the shaft 37 and cams 38. Thus irrespective of removal of the obstruction frame 11 will not be fully raised.

An associated problem has also been noted in the situation where the frame 11 is fully raised, and is impacted by a "low-point" on an uneven ULD, or is impacted by a ULD or the like being overweight or dropped onto the rollers 15a. Because the shaft 37 and cams 38 are locked by the brake 77 the only way in which such sudden shock loadings on the rollers 15a can be accommodated is by flexure of the rubber tyres of the rollers, and this may not be sufficient to prevent damage to the PDU in all circumstances.

Figure 3:
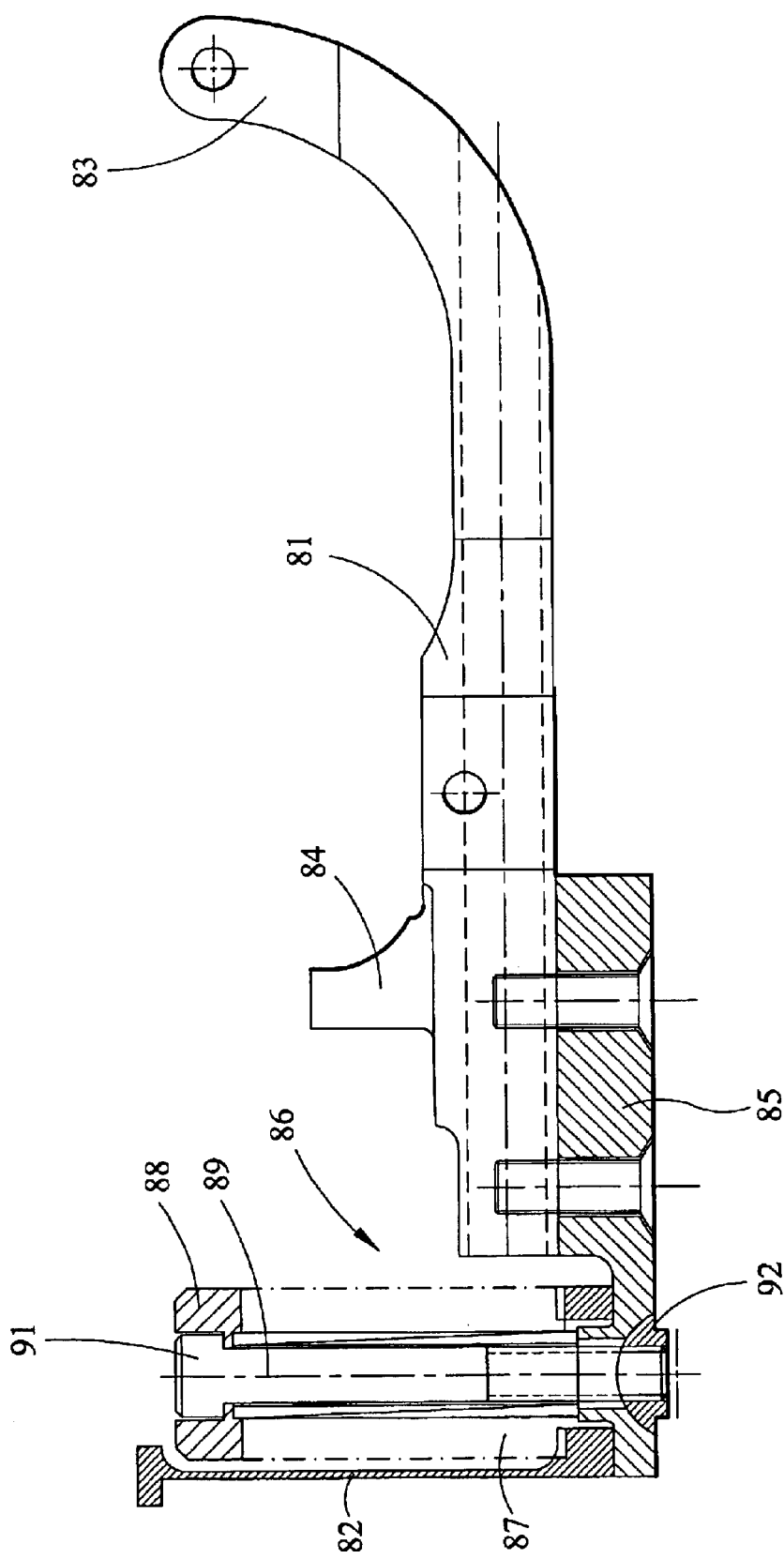
FIG. 3 is a cross-sectional representation of a mounting arrangement for the power drive unit of FIG. 2; and, FIG. 4 is a diagrammatic representation of the PDU control system.

Accordingly, in order to overcome these disadvantages noted in the construction of FIG. 2, the manner in which the frame 11 is supported from the fixed support structure of the deck is arranged to include resiliently compliant couplings. A preferred arrangement of such a coupling is illustrated with reference to FIG. 3 which shows one of a pair of chassis members 81 by means of which the frame 11 is secured to the rigid support structure 82 of the deck of the cargo area. Each chassis member 81 extends beneath the deck panel of the deck of the cargo area and is apertured at one end 83 to receive a pivot pin extending through a respective mounting 12 of the frame 11. Thus the pivot pins pivotally secure the frame 11 to the two chassis members 81 for pivotal movement about the axis 13. The chassis members 81 extend beneath the frame 11 in use and each has an upstanding cam follower 84 engageable by a respective cam 38 of the frame 11.

At its end remote from the pivot axis 13 each chassis member 81 is bolted to an adaptor rail 85 which in turn is secured to the structure 82 through a resiliently compliant coupling 86. It will however be understood that in some embodiments it will be appropriate to manufacture the chassis members 81 with the adaptor rails as integral parts of the members 81.

Each coupling 86 includes a spring arrangement which may be a coil spring or, as shown in the drawings, a stack of "Bellville" spring washers 87, one end of the stack engaging the support structure 82, and the opposite end of the stack acting through a load washer 88 against the head 91 of an elongate bolt 89. The shank of the bolt 89 extends through pack 87 and through a clearance aperture in the structure 82 into screw threaded engagement with a part-spherical nut 92 on the respective adaptor rail 85. Normally the pre-stressing of the spring washers of the pack 87 holds the adaptor rail 85 in facial contact with a surface of the support structure 82. However, a load applied to the chassis member 81 sufficient to overcome the pre-stressing of the spring pack 87 will cause the chassis member 81 and its associated rail 85 to deflect relative to the support structure 82 further compressing the spring pack 87. It will be recognised that where the load on the chassis member 81 is removed then the restoring action of the spring pack 87 will return the chassis member 81 and the associated rail 85 to appropriate alignment with the structural member 82.

In operation therefore when the frame 11 is being raised relative to the chassis members 81, should the raising movement of the frame 11 be obstructed then sufficient torque can be applied by way of the torque limiting device 75 to deflect the or each chassis member 81 relative to the support structure 82 so permitting the frame 11 to reach its fully raised position relative to the chassis members 81. Thereafter the brake 77 will lock the frame 11 in its fully raised position relative to the chassis members 81 and when the obstruction to raising movement of the frame 11 is removed the spring packs 87 will restore the alignment of the chassis members 81 and the structural supports 82 thus lifting the frame 11 to occupy the fully raised position relative to the deck panel.

Similarly, should the rollers 15a be subjected to impact loadings having a vector in the direction of lowering the frame 11 then the resiliently compliant mountings 86 will deflect to allow deflection of the frame 11 and rollers 15a rather than the mechanism being subject to the risk of damage. The chassis members 81 and frame 11 will be restored to their original positions upon removal of the impact loading by the restoring action of the spring packs 87.

It will be understood therefore that although the PDU described in relation to FIG. 2 can be used without the resiliently compliant mountings, the mountings are used in a preferred embodiment to enhance the performance of the PDU.

In a modification of the PDU described above a sensor 90 of any convenient form monitors rotation of the shaft 37 and so can signal the control system 80 when the lift cams 38 are in a fully operational position. Such a signal can be used by the control system 80 to initiate operation of the brake 77 to lock the frame 11 in the fully raised position and to disengage the clutch 71. If desired the sensor 90 can replace the timer 80*a* as the "lock" signal generator, but desirably the sensor is used in conjunction with the timer, the signal from the sensor 90 being gated by the control system 80 with the signal from the timer 80*a* to ensure that locking of the frame in the raised position occurs in response to receipt of the first of the two signals. If desired the gating can ensure that locking occurs only on receipt of both signals.

What is claimed is:

1. A power drive unit (PDU) for cargo handling systems comprising a frame arranged to be mounted in use for raising and lowering movement relative to a supporting structure, a drive motor carried by the frame and having an output shaft, a drive roller assembly carried by said frame for engagement in use with a unit load device (ULD) or the like to be moved by the PDU, a first gear train transmitting drive from said motor output shaft to a drive roller of said drive roller assembly, a rotatable lifting cam assembly carried by said frame and driven in use relative to said frame to lift and lower the frame on said mounting, a second gear train for transmitting drive from said motor output shaft to said lifting cam assembly to operate said lifting cam assembly, clutch means operable to connect and disconnect said motor output shaft to and from said second gear train, a torque limiting device limiting the torque transmitted through said clutch, when said clutch is engaged, to said lifting cam assembly, and a brake mechanism between said torque limiting device and said lifting cam assembly for braking said lifting cam assembly against rotation relative to said frame.

2. A power drive unit as claimed in claim 1 including a control system which is arranged to receive control input from an operator and to effect control over operation of said motor, said clutch, and said brake mechanism.

3. A power drive unit as claimed in claim 2 wherein said control system includes a timer arranged so that after the lapse of a pre-determined time period from the point at which the motor is operated to raise the frame, the control system initiates operation of said brake to lock said lifting cam assembly, and disengages said clutch to disconnect said second gear train from said motor output shaft.

4. A power drive unit as claimed in claim 2 wherein said control system includes a sensor detecting the fully raised position of the frame and in response thereto signalling the control system to initiate operation of said brake to lock said lifting cam assembly, and disengage said clutch to disconnect said second gear train from said motor output shaft.

5. A power drive unit as claimed in claim 2 wherein the control system includes both a timer which is arranged to produce a signal after the lapse of a pre-determined time period from the point at which the motor is operated to raise the frame, and a sensor detecting the fully raised position of the frame and producing a signal responsive thereto, the control system responding to the earliest of the, or both, signals to initiate operation of said brake to lock said lifting cam assembly, and disengage said clutch to disconnect said second gear train from said motor output shaft.

6. A power drive unit as claimed in claim 3 wherein the control system is so arranged that said clutch is disengaged fractionally after engagement of said brake.

7. A power drive unit as claimed in claim 4 wherein the control system is so arranged that said clutch is disengaged fractionally after engagement of said brake.

8. A power drive unit as claimed in claim 5 wherein the control system is so arranged that said clutch is disengaged fractionally after engagement of said brake.

9. A power drive unit as claimed in claim 1 including a resiliently compliant mounting system which is interposed between said frame and said fixed support structure which supports the power drive unit in use.

10. A power drive unit as claimed in claim 9 wherein said power drive unit includes a chassis to which said frame is pivotally mounted, and said resiliently compliant coupling mechanism secures said chassis to said fixed support structure in use.

11. A power drive unit as claimed in claim 1 wherein the roller assembly includes first and second axially aligned rollers carried by bearing supports at both axial ends of the assembly.

12. A power drive unit as claimed in claim 2 including a further brake for braking the motor output shaft, said further brake also being under the control of said control mechanism.

* * * * *